United States Patent
Fischbein

(10) Patent No.: US 10,059,243 B2
(45) Date of Patent: Aug. 28, 2018

(54) MOTOR VEHICLE HAVING A SLOPING FOOTREST

(71) Applicant: Ford Global Technologies, LLC, Dearborn, MI (US)

(72) Inventor: Igor Fischbein, Cologne (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/695,095

(22) Filed: Sep. 5, 2017

(65) Prior Publication Data
US 2018/0065532 A1    Mar. 8, 2018

(30) Foreign Application Priority Data

Sep. 5, 2016 (DE) .......... 10 2016 216 752

(51) Int. Cl.
*B60N 3/06* (2006.01)
*B60N 2/90* (2018.01)
*B62D 25/20* (2006.01)

(52) U.S. Cl.
CPC .......... *B60N 3/06* (2013.01); *B60N 2/995* (2018.02); *B62D 25/20* (2013.01)

(58) Field of Classification Search
CPC .......... B60N 3/06; B60N 3/063; B60N 3/066
USPC .......................................... 296/75
See application file for complete search history.

(56) References Cited

U.S. PATENT DOCUMENTS

| 6,318,785 | B1 | 11/2001 | Tousignant |
| 8,807,623 | B2 | 8/2014 | Bohmer et al. |
| 2010/0230990 | A1* | 9/2010 | Shukuri ............... B60N 3/066 296/75 |
| 2018/0093600 | A1* | 4/2018 | Artigas Monroy .... B60N 3/063 |

FOREIGN PATENT DOCUMENTS

| CN | 103358963 A | 10/2013 |
| CN | 203888710 U | 10/2014 |
| DE | 19548483 A1 | 6/1997 |
| GB | 2508607 A | 6/2014 |
| JP | 2013092984 A | 5/2013 |

\* cited by examiner

*Primary Examiner* — Jason S Morrow
(74) *Attorney, Agent, or Firm* — Vichit Chea; Price Heneveld LLP

(57) ABSTRACT

A motor vehicle, such as a narrow motor vehicle, e.g., a left-hand drive motor vehicle, has a driver's seat and a driver's footwell, in which a footrest having a fixed tread surface is mounted. The transverse axis of the tread surface extends at an angle to a horizontal plane in which the front wheel axis of the motor vehicle is situated. In this arrangement, the tread surface slopes downward away from the longitudinal axis of the motor vehicle, wherein the angle is chosen in accordance with the distance between the center of the tread surface of the footrest and an outer side wall of the driver's footwell and is in a range of 1-5 degrees.

17 Claims, 5 Drawing Sheets

MOTOR VEHICLE HAVING A SLOPING FOOTREST

FIELD OF THE INVENTION

The present invention generally relates to a motor vehicle, and more particularly to a vehicle having a footrest with a sloping tread surface.

BACKGROUND OF THE INVENTION

Footrests are commonly located in the driver's footwell of a motor vehicle to enable the driver to place his or her left foot on the footrest when there is no need for any clutch operations. Particularly in the case of narrow vehicles, however, there is often insufficient space between the front wheels to accommodate and arrange footrests and pedals for the clutch, brake and accelerator in an optimum manner. For this reason, the entire arrangement comprising the pedals and footrests is typically arranged offset slightly inward, that is to say to the right in the case of left-hand drive vehicles, for example. However, this often leads to a less comfortable position of the left foot of a driver, especially if he or she wishes to place this foot on the footrest.

In order to provide a comfortable sitting and foot position, particularly for the driver of a narrow vehicle, there is already a known practice of turning the entire driver's seat in an advantageous manner. GB 2 508 607 A, for example, discloses a relatively narrow and short passenger vehicle which is intended to allow several such vehicles to be parked in a single parking space without obstructing passing traffic and/or compromising seating comfort for the occupants. In this case, use is made of a seating arrangement in which a front seat and a rear seat are arranged offset relative to one another in a longitudinal direction. Here, the longitudinal center line of the front seat is arranged at a different angle to the central longitudinal axis of the vehicle than the longitudinal center line of the rear seat. In particular, provision is made for the entire front seat to be turned slightly inward in relation to the longitudinal axis of the vehicle. This inward rotation of the driver's seat has the effect that the foot of the driver is at a greater distance from the adjacent outer wall of the passenger compartment.

In the area of the footrests themselves, measures to enhance the sitting comfort of the driver have also been disclosed. DE 195 48 483 A1, for example, discloses a footrest having a tread plate that can be moved between a rest position and a use position. In the rest position, the surface of the tread plate preferably lies flush within a recess in the vehicle floor, wherein it can be pivoted upward into an oblique use position by means of pivoted levers. For this purpose, a compressed air system is used, for example. U.S. Pat. No. 6,318,785 B1 also discloses a movable footrest in the footwell of a motor vehicle, wherein the footrest is provided for passenger seats and can be moved up and down.

JP 2013-09298 A discloses a footrest for the footwell of a motor vehicle, wherein this footrest is arranged between a brake pedal and an accelerator pedal and is intended to enable the foot to change easily from the brake pedal to the accelerator pedal and vice versa. In this case, the two pedals are mounted so close to the central footrest that the driver can place his or her heel on the footrest and can swing his or her toes between the two pedals.

U.S. Pat. No. 8,807,623 B2 proposes a movable footrest having a tread surface that can be moved in different directions. Here, it is possible, in particular, for the angle, depth and a rotation angle of the footrest to be adjusted.

In the light of the prior art indicated, there is still room for improvement in the design of footrests for the footwell of motor vehicles. It would be desirable to provide a motor vehicle having a footrest in the driver's footwell which allows as comfortable as possible support for the left foot of the driver.

SUMMARY OF THE INVENTION

According to one aspect of the present invention, a motor vehicle is provided. The motor vehicle includes a driver's seat, a driver's footwell, and a footrest mounted in the footwell and having a fixed tread surface. The transverse axis of the tread surface extends at an angle to a horizontal plane in which a front wheel axis of the motor vehicle is situated, wherein the tread surface slopes downward away from a longitudinal axis of the motor vehicle, wherein the angle is chosen in accordance with a distance between a center of the tread surface of the footrest and an outer side wall of the driver's footwell and is in a range of 1-5 degrees.

According to another aspect of the present invention, a motor vehicle is provided. The motor vehicle includes a seat, a footwell, and a footrest mounted in the footwell and having a fixed tread surface with a transverse axis extending at an angle in a range of 1-5 degrees relative to a horizontal plane in which a front wheel axis of the vehicle is situated, wherein the tread surface slopes downward away from a longitudinal axis of the vehicle.

These and other aspects, objects, and features of the present invention will be understood and appreciated by those skilled in the art upon studying the following specification, claims, and appended drawings.

DETAILED DESCRIPTION OF THE PREFERRED EMBODIMENTS

In the different figures, identical parts are always provided with the same reference signs, and so the parts are generally also described only once.

Figure 1:
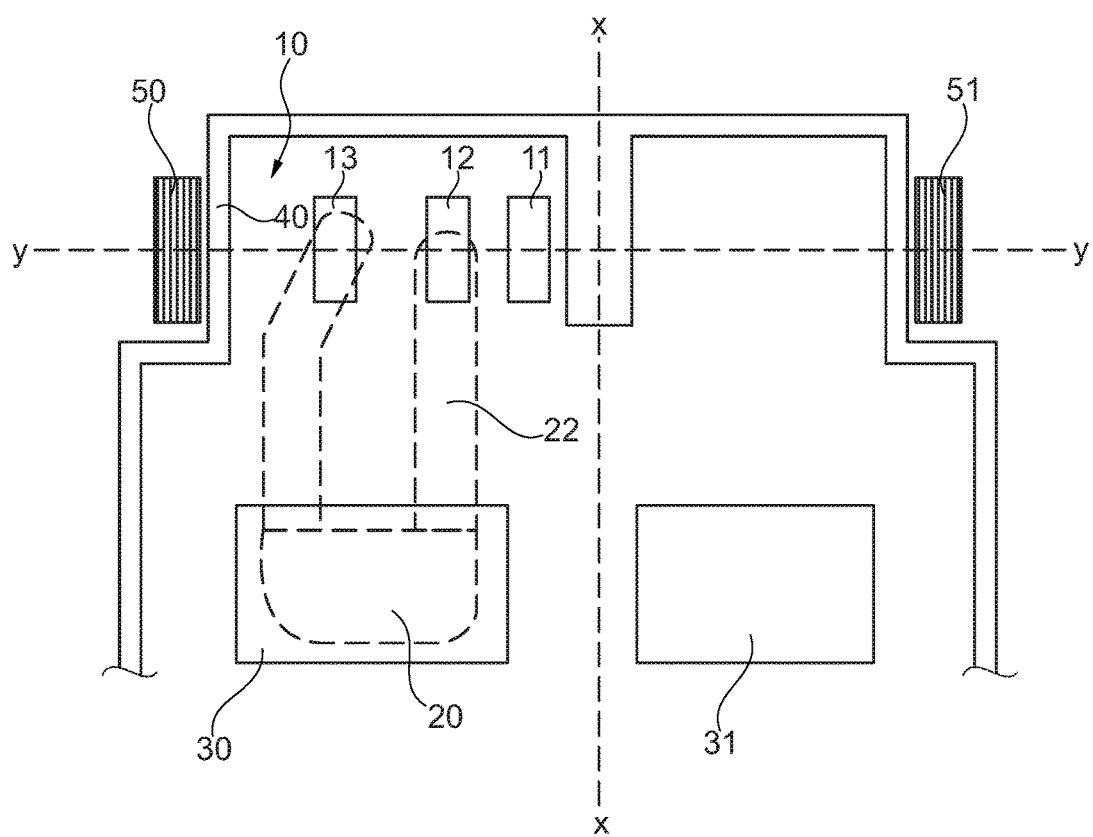
FIG. 1 is a schematic diagram illustrating a footwell of a motor vehicle equipped with a footrest.

FIG. 1 shows a schematic detail of the front area of a narrow motor vehicle. Here, the footwell 10 illustrated is situated on the driver's side of a motor vehicle, between two front wheels 50 and 51. By way of example, this is a left-hand drive motor vehicle, and therefore the driver 20 illustrated in dashed lines sits on the front left-hand seat. There is at least an accelerator pedal 11 and a brake pedal 12 in the footwell 10. In addition, a clutch pedal can optionally be provided to the left of the brake pedal 12. The longitudinal axis of the motor vehicle is denoted by X-X.

There is likewise a footrest 13 to the left of the brake pedal 12 (or the optional clutch pedal). The driver 20 can place the foot of his or her left leg 21, particularly the foot, on the footrest 13, while he or she switches between the brake pedal 12 and the accelerator pedal 11 with the foot of his or her right leg 22. Here, the tread surface of the footrest 13 slopes downward and outward in the direction of the side wall 40, with the result that its transverse axis extends at an angle to the front wheel axis Y-Y of the motor vehicle. If the driver 20 places his or her left foot of the left leg 21 on this footrest 13, the foot tilts slightly outward, as a result of which his or her left knee tilts outward in such a way that his or her leg 21 adopts a more comfortable position than is the case with a footrest that extends horizontally.

In the figures, the footrest 13 is illustrated only schematically and, in principle, can be designed in various known ways. For example, it can be a supporting surface which is formed within the side wall 40. However, it can also comprise a separate plate which is mounted in this area on the side wall or on the floor. Normally, the tread surface of a footrest 13 of this kind is defined by the fact that it has a ridged surface in order to prevent the foot of the driver from accidentally slipping off A second seat, i.e., a front passenger seat 31, can be arranged directly to the right of the driver's seat 30. However, in the case of very narrow motor vehicles, this front passenger seat 31 can also be arranged offset along the longitudinal axis X-X. The passenger then preferably sits somewhat behind the driver. However, it is also possible for the passenger to sit ahead of the driver. Moreover, the driver's seat 30 and/or the front passenger seat 31 can also be slightly oblique. For example, the front side of the driver's seat 30 can face inward in the direction of the longitudinal axis X-X of the motor vehicle. In contrast, the front side of the front passenger seat 31 can face away from the longitudinal axis X-X. In this case, inward angles of the order of 0.1 to 7 degrees can be envisaged.

Figure 2:
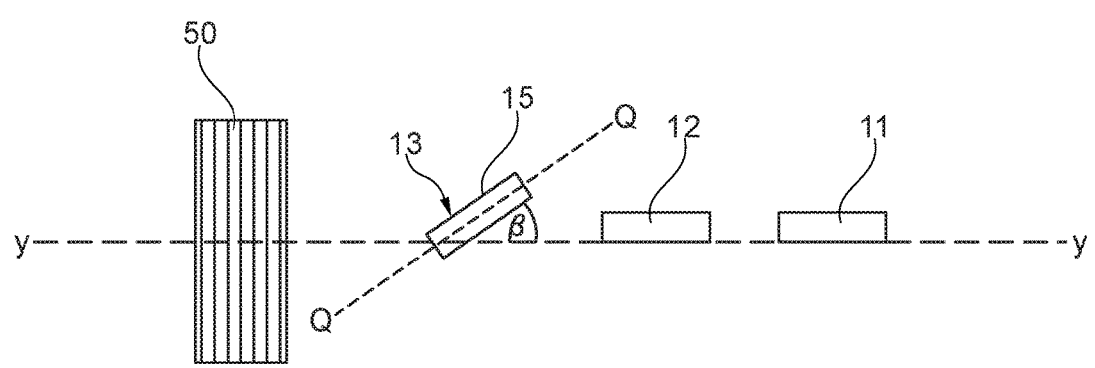
FIG. 2 is a schematic diagram illustrating the slope of the footrest, according to one embodiment.

FIG. 2 shows schematically the position of the tread surface 15 of a footrest 13 relative to the horizontally extending front wheel axis Y-Y. The footrest 13 is situated next to the accelerator pedal 11 and the brake pedal 12. The transverse axis Q-Q of the tread surface 15 extends obliquely at an angle $\beta>0$ to the front wheel axis Y-Y or to a horizontal plane through this front wheel axis Y-Y. This angle $\beta$ can be between 1-5 degrees, in particular approximately two degrees.

FIG. 3 again shows schematically a detail of the front area of a narrow motor vehicle, the configuration of which corresponds substantially to the embodiment in FIG. 1. Here, the footwell 10 illustrated is once again situated on the driver's side of a motor vehicle, between two front wheels 50 and 51. There is at least an accelerator pedal 11 and a brake pedal 12 in the footwell 10. In addition, a clutch pedal can optionally be provided to the left of the brake pedal 12 in this embodiment.

There is likewise a footrest 13 to the left of the brake pedal 12 (or the optional clutch pedal). Here, the tread surface of the footrest 13 is turned outward in the direction of the side wall 40, next to which the footrest 13 is situated. The longitudinal axis of the tread surface of the footrest 13 thus extends at an angle to the longitudinal axis X-X of the motor vehicle, wherein its front side faces away from this longitudinal axis X-X. If the driver 20 places his or her left foot on this footrest 13, his or her toes point slightly outward, as a result of which his or her left knee tilts outward in such a way that his or her leg 21 adopts a more comfortable position than is the case with a footrest that extends parallel to the longitudinal axis X-X of the motor vehicle.

Also in this embodiment, a second seat, i.e., a front passenger seat 31 can be arranged directly to the right of the driver's seat 30. However, in the case of very narrow motor vehicles, this front passenger seat 31 can also be arranged offset rearward along the longitudinal axis X-X. The passenger then sits somewhat behind the driver. Moreover, the driver's seat 30 and/or the front passenger seat 31 can also be slightly oblique. For example, the front side of the driver's seat 30 can face inward in the direction of the longitudinal axis X-X of the motor vehicle. In contrast, the front side of the front passenger seat 31 can face away from the longitudinal axis X-X. In this case also, inward angles of the order of 0.1 to 7 degrees can be envisaged.

Figure 3:
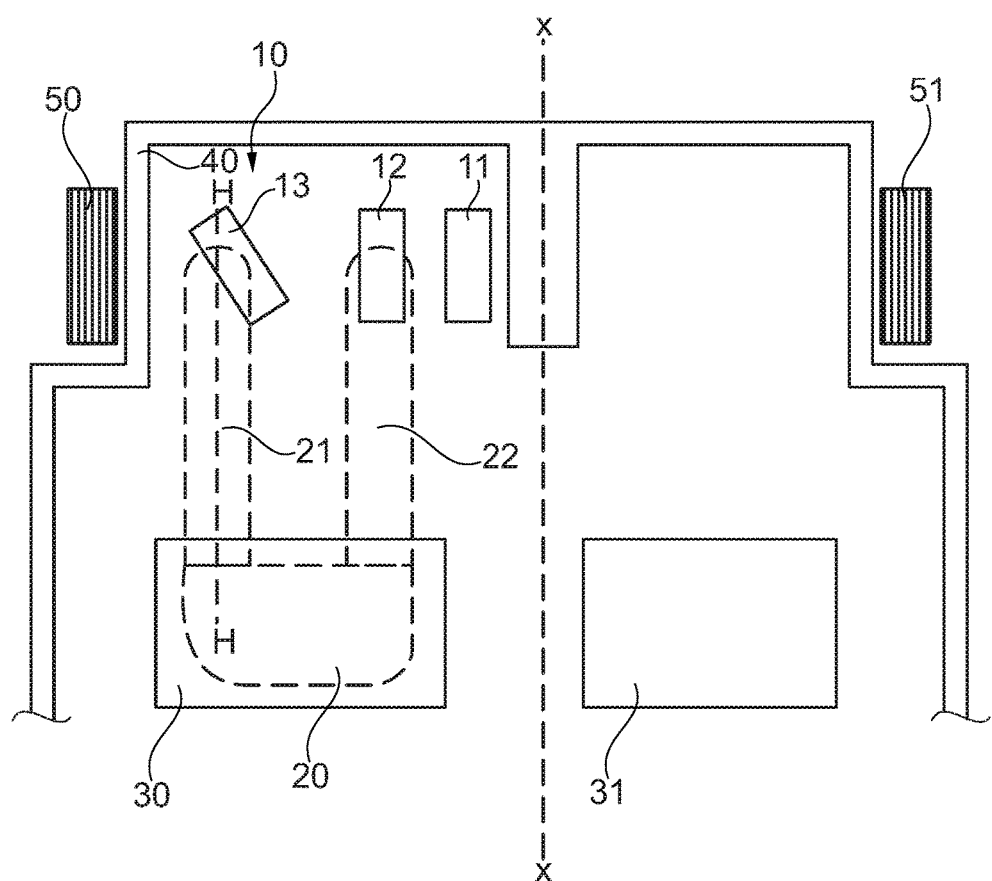
FIG. 3 is a schematic diagram illustrating an embodiment of a motor vehicle footwell having the footrest turned outward.
Figure 4:
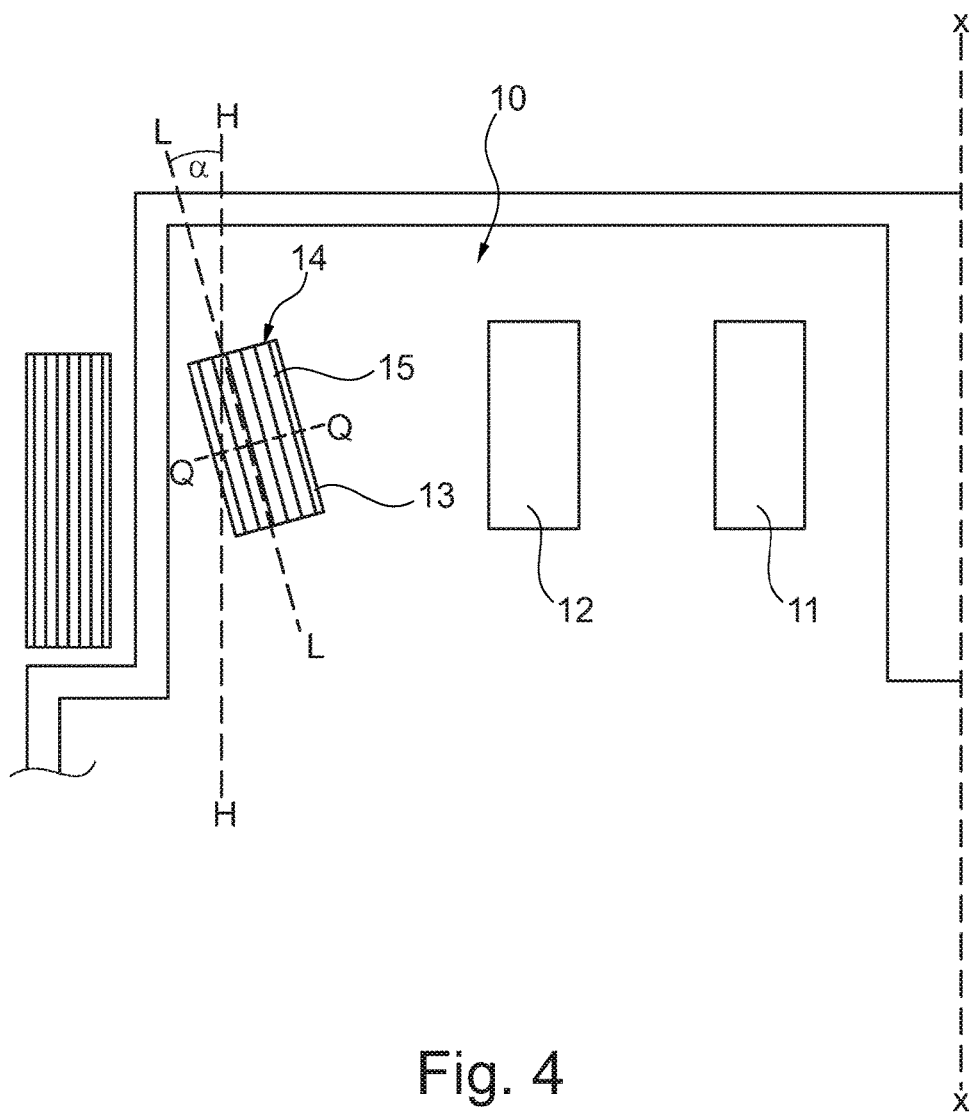
FIG. 4 is a first enlarged view of the footwell shown in FIG. 3.

FIG. 4 shows a first enlarged view of the pedals 11 and 12 in the driver's footwell 10. Here, the line H-H is indicated, which extends parallel to the longitudinal axis X-X of the motor vehicle through the left hip of the driver (see FIG. 3). The center of the tread surface 15 of the footrest 13, which is marked with a cross, is adjacent to this hip-leg line H-H, wherein the center of the tread surface 15 is to the right of this hip-leg line H-H. Thus, the driver has to move his or her left leg slightly to the right to place his or her left foot on the footrest 13.

The longitudinal direction L-L of the tread surface 15 of the footrest 13 is also indicated in FIG. 4. This longitudinal axis L-L extends obliquely to the longitudinal axis X-X of the motor vehicle and thus also to the hip-leg line H-H. In this case, the longitudinal axis L-L extends at an angle $\alpha$ to these two lines. This angle $\alpha$ is indicated in FIG. 4 and in FIG. 5, and can be between 1-5 degrees, and in particular approximately two degrees, according to one embodiment.

Figure 5:
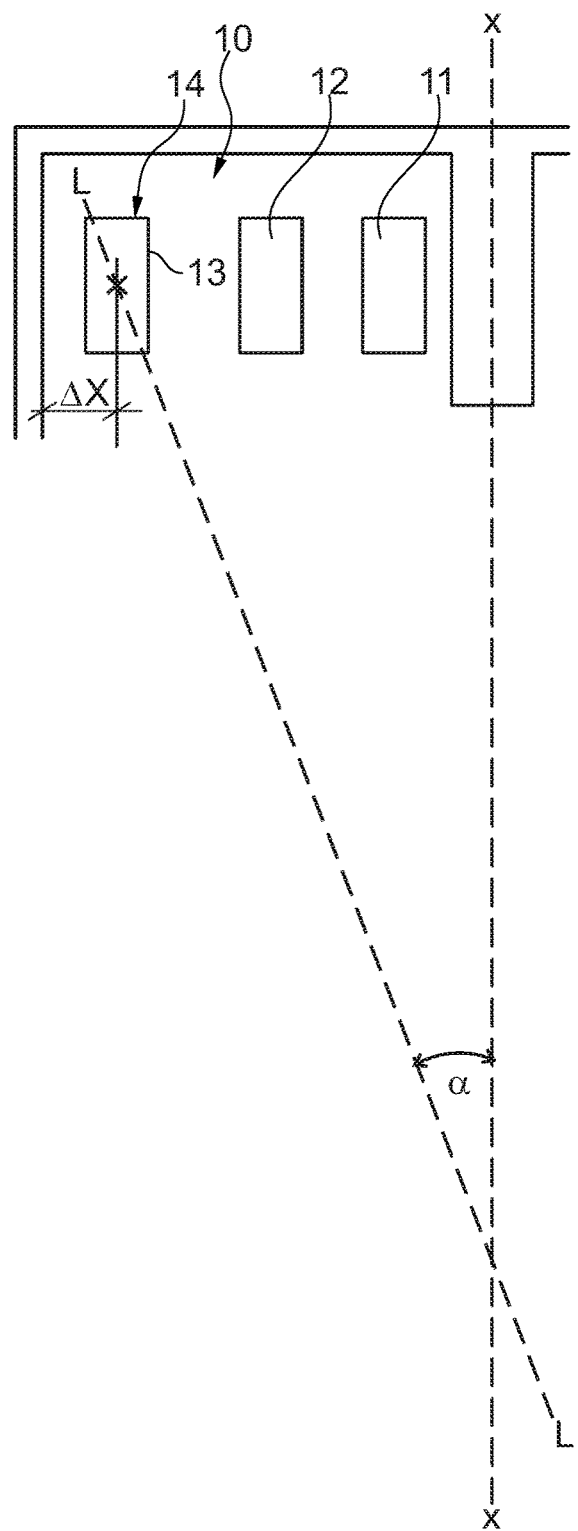
FIG. 5 is a second enlarged view of the footwell shown in FIG. 3.

Furthermore, FIG. 5 shows the distance $\Delta x$ between the center of the tread surface 15 of the footrest 13 and the side wall 40 next to the footrest 13. The angle $\alpha$ can be chosen in accordance with this distance $\Delta x$. The smaller this distance $\Delta x$, the larger is the angle $\alpha$ which is preferably chosen.

The embodiments in FIGS. 1 and 3 can also be combined. In such an embodiment, it is the case both that the transverse axis Q-Q of the tread surface 15 of the footrest 13 slopes at an angle $\beta$ to the front wheel axis Y-Y and that the longitudinal axis L-L of the tread surface 15 of the footrest 13 is turned at an angle $\alpha$ to the longitudinal axis X-X of the motor vehicle. In this way, the advantages of both tilt angles can be used for a more ergonomic leg position. However, both tilt angles can also be implemented individually, wherein each tilt angle per se already allows a more ergonomic leg position.

It is conceivable, in accordance with other embodiments, if, in addition to the footrest according to the embodiment shown, a suitable knee rest can be provided on one side wall, thus allowing the driver to support his or her knee in a comfortable manner.

It is pointed out that the features and measures specified individually in the description may be combined with one another in any desired technically meaningful way and discloses further refinements of the invention.

The motor vehicle according to one embodiment has a driver's seat and a driver's footwell. Mounted in this driver's footwell is a footrest having a tread surface, wherein the tread surface is fixed, i.e., the position thereof within the driver's footwell is invariable. Thus, the tread surface is not movable but is fixed. Here, the tread surface of the footrest can be defined by a border, within which there is typically a ridged surface, for example. However, it can also merely be a surface that is ridged or defined in some other way on a raised area of the footwell shell.

Normally, a tread surface of this kind is of rectangular or oval design. The longitudinal axis is provided by the longer side of the tread surface, i.e., a longitudinal axis L-L extends through the tread surface in the direction of the longer side. In contrast, a transverse axis Q-Q extends in the direction of the shorter side of the tread surface.

According to one embodiment, this transverse axis Q-Q of the tread surface extends at an angle β to a horizontal plane in which the front wheel axis Y-Y of the motor vehicle is situated. Thus, if a horizontal plane is created on the front wheel axis Y-Y, the transverse axis of the tread surface is at an angle β>0 to this horizontal plane. In this case, the tread surface slopes downward away from the longitudinal axis X-X of the motor vehicle. Thus, the tread surface of the footrest is lowered outward. As a result, a driver's foot placed thereon tilts outward. In the case of the left foot of a driver, the left side of the foot is then lower than the right side. When supporting his or her left leg on the footrest, this enables the driver to move this leg into a comfortable position, in which the knee is tilted slightly outward. Thus, an ergonomic footrest is provided.

According to one embodiment, the angle β is chosen in accordance with the distance Δx between the center of the tread surface of the footrest and an outer side wall of the driver's footwell and is in a range of 1-5 degrees. The smaller the distance Δx between the center of the tread surface of the footrest and the outer side wall of the driver's footwell, the larger the angle β chosen can be, for example. Thus, the closer the footrest is situated to the left-hand side wall of the footwell, the more steeply the tread surface of the footrest can slope outward.

At the same time, the angle β does not have to be particularly large, but angles β in the range of 1-5 degrees have already proven advantageous. In one embodiment, the angle β is two degrees.

An outward-sloping footrest of this kind is advantageous particularly if the center of the tread surface of the footrest lies adjacent to a line H-H which runs parallel to the longitudinal axis X-X of the motor vehicle through the left hip of a driver on the driver's seat, wherein the center of the tread surface is arranged offset to the longitudinal axis X-X of the motor vehicle. If a driver on the driver's seat stretches his or her left leg straight ahead, the footrest is thus on the right next to his or her leg. In order to place the left foot on the footrest, the driver must move the left leg slightly to the right, which can be uncomfortable. The outward slope of the tread surface of the footrest enables the driver to place his or her foot slightly askew on the footrest, as a result of which his or her knee tilts slightly outward. This brings the driver's left leg into a more comfortable position than in the case of a footrest, the tread surface of which is horizontal.

An arrangement of this kind, in which the center of the tread surface of the footrest is to the right of a line H-H which runs parallel to the longitudinal axis X-X of the motor vehicle through the left hip of a driver on the driver's seat is found particularly in very narrow motor vehicles. These motor vehicles often provide in the driver's footwell a unit comprising at least an accelerator pedal, a brake pedal and the footrest, wherein the entire unit is arranged offset toward the longitudinal axis X-X of the motor vehicle to enable the unit to be positioned as well as possible, despite the reduced vehicle width. In this case, certain spacings must also be maintained between the pedals. The embodiment of a footrest with an outward-sloping tread surface can be provided particularly in a narrow motor vehicle of this kind.

In one embodiment, the tread surface of the footrest not only extends obliquely to a horizontal plane through the front wheel axis but also obliquely to the longitudinal axis of the motor vehicle. Here, the longitudinal axis L-L of the tread surface of the footrest extends at an angle α>0 to the longitudinal axis X-X of the motor vehicle, wherein the front side of the tread surface faces away from the longitudinal axis X-X of the motor vehicle. Here, the front side denotes the side of the tread surface which faces the front of the motor vehicle. The tread surface of the footrest is thus turned outward, with the result that the toes of a driver's foot placed thereon also face outward. When supporting his or her left leg on the footrest, this too enables the driver to move this leg into a comfortable position, in which the knee is tilted slightly outward.

Both tilt angles α and β of the tread surface can be implemented in combination, but rotation of the longitudinal axis L-L of the tread surface of the footrest at an angle α to the longitudinal axis X-X of the motor vehicle, wherein the front side of the tread surface faces away from the longitudinal axis X-X of the motor vehicle, can also bring about an advantageous position of the leg or foot of a driver as an isolated measure. In this variant too, the angle α can advantageously be chosen in accordance with the distance Δx between the center of the tread surface of the footrest and an outer side wall of the driver's footwell. The smaller the distance Δx between the center of the tread surface of the footrest and the outer side wall of the driver's footwell, the larger the angle α chosen can be. Thus, the closer the footrest is situated to the left-hand side wall of the footwell, the more steeply the tread surface of the footrest can be turned outward.

At the same time, the angle α does not have to be particularly large, but angles α in the range of 1-5 degrees, for example, have proven advantageous. In one embodiment, the angle α is two degrees.

In the case of very narrow motor vehicles, provision is often made for the driver's seat not to be situated precisely next to a front passenger seat since there is insufficient space for such an arrangement. In one embodiment, the refinement of a footrest is therefore provided in a motor vehicle in which a front passenger seat is arranged offset in the direction of the rear of the vehicle along the longitudinal axis X-X of the motor vehicle relative to the driver's seat.

Provision can furthermore be made for a longitudinal axis to pass through the driver's seat at an angle to the longitudinal axis X-X of the motor vehicle, wherein the front side of the driver's seat faces toward the longitudinal axis X-X of the motor vehicle. The driver's seat is then oriented slightly inward, with the result that the driver's legs also point slightly inward. However, even in the case of such a motor vehicle, it can be advantageous if the tread surface of a footrest slopes and/or is turned slightly outward.

The footrest in the embodiment shown can be used in a left-hand drive motor vehicle, and is particularly well-suited for use in a narrow or very narrow motor vehicle. However, it should be appreciated that the footrest may be used in a right-hand drive motor vehicle and wide motor vehicles.

It will be understood that any described processes or steps within described processes may be combined with other disclosed processes or steps to form structures within the scope of the present invention. The exemplary structures and processes disclosed herein are for illustrative purposes and are not to be construed as limiting.

What is claimed is:

1. A motor vehicle comprising:
a driver's seat;

a driver's footwell; and a footrest mounted in the footwell and having a fixed tread surface, wherein transverse axis of the tread surface extends at an angle to a horizontal plane in which a front wheel axis of the motor vehicle is situated, wherein the tread surface slopes downward away from a longitudinal axis of the motor vehicle, wherein the angle is chosen in accordance with a distance between a center of the tread surface of the footrest and an outer side wall of the driver's footwell and is in a range of 1-5 degrees.

2. The motor vehicle as claimed in claim 1, wherein a unit comprising at least an accelerator pedal, a brake pedal and the footrest is mounted in the driver's footwell.

3. The motor vehicle as claimed in claim 1, wherein the angle is larger, the smaller the distance Δx between the center of the tread surface of the footrest and the outer side wall of the driver's footwell.

4. The motor vehicle as claimed in claim 3, wherein the angle is approximately two degrees.

5. The motor vehicle as claimed in claim 1, wherein a front passenger seat is arranged offset in the direction of the rear of the vehicle along the longitudinal axis of the motor vehicle relative to the driver's seat.

6. The motor vehicle as claimed in claim 1, wherein a longitudinal axis passes through the driver's seat at an angle to the longitudinal axis of the motor vehicle, wherein the front side of the driver's seat faces toward the longitudinal axis of the motor vehicle.

7. The motor vehicle as claimed in claim 1, wherein the longitudinal axis of the tread surface extends at an angle α to the longitudinal axis of the motor vehicle, wherein the front side of the tread surface faces away from the longitudinal axis of the motor vehicle.

8. The motor vehicle as claimed in claim 1, wherein the motor vehicle is a left-hand drive motor vehicle.

9. A motor vehicle comprising:
a seat;
a footwell; and
a footrest mounted in the footwell and having a fixed tread surface with a transverse axis extending at an angle in a range of 1-5 degrees relative to a horizontal plane in which a front wheel axis of the vehicle is situated, wherein the tread surface slopes downward away from a longitudinal axis of the vehicle.

10. The motor vehicle as claimed in claim 9, wherein the angle is chosen in accordance with a distance between a center of the tread surface of the footrest and an outer side wall of the footwell.

11. The motor vehicle as claimed in claim 9, wherein the footwell is a driver's footwell and a unit comprising at least an accelerator pedal, a brake pedal and the footrest is mounted in the driver's footwell.

12. The motor vehicle as claimed in claim 9, wherein the angle is larger, the smaller the distance between the center of the tread surface of the footrest and the outer side wall of the footwell.

13. The motor vehicle as claimed in claim 12, wherein the angle is approximately two degrees.

14. The motor vehicle as claimed in claim 11, wherein a front passenger seat is arranged offset in the direction of the rear of the vehicle along the longitudinal axis of the motor vehicle relative to the driver's seat.

15. The motor vehicle as claimed in claim 9, wherein a longitudinal axis passes through the seat at an angle to the longitudinal axis of the motor vehicle, wherein the front side of the seat faces toward the longitudinal axis of the motor vehicle.

16. The motor vehicle as claimed in claim 9, wherein the longitudinal axis of the tread surface extends at an angle α to the longitudinal axis of the motor vehicle, wherein the front side of the tread surface faces away from the longitudinal axis of the motor vehicle.

17. The motor vehicle as claimed in claim 9, wherein the motor vehicle is a left-hand drive motor vehicle.

\* \* \* \* \*